United States Patent [19]

Sidline et al.

[11] 4,361,755
[45] Nov. 30, 1982

[54] MAGNETIC CARD FEED MECHANISM AND IMPACTOR

[75] Inventors: George B. Sidline, Belmont; John F. Henshaw, Mill Valley; Eugene S. Elkus, Atherton, all of Calif.

[73] Assignee: Service Distributors, Inc., San Francisco, Calif.

[21] Appl. No.: 161,333

[22] Filed: Jun. 20, 1980

[51] Int. Cl.³ ............................................ G06K 13/00
[52] U.S. Cl. .................................................. 235/476
[58] Field of Search ............... 178/92; 235/434, 375, 235/380, 381, 382, 419, 420, 433, 435, 449, 470, 472, 474, 475, 476, 477, 480, 482; 360/2, 6, 51, 52, 88

[56] References Cited

U.S. PATENT DOCUMENTS

| | | | |
|---|---|---|---|
| 3,914,789 | 10/1975 | Coker, Jr. et al. | 235/449 |
| 4,020,325 | 4/1977 | Pfost et al. | 235/480 |
| 4,024,379 | 5/1977 | Pfost et al. | 235/380 |

Primary Examiner—Thomas A. Robinson
Attorney, Agent, or Firm—Julian Caplan

[57] ABSTRACT

A card having a longitudinal strip of encoded magnetic tape is inserted in a slot in a machine which feeds the card into the machine, reads the information on the strip, reverses the direction of the card and impacts the card to form an indentation to indicate a use of the card. The card is initially encoded for plural uses. Each time the card is used, the number of available uses is decreased on the information on the strip and corresponding indentations are impacted on the card.

7 Claims, 8 Drawing Figures

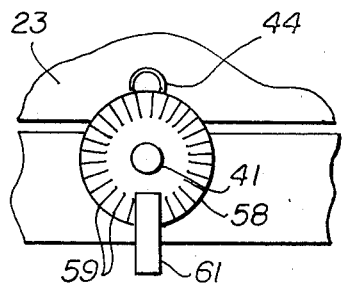
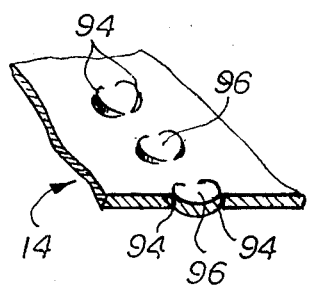
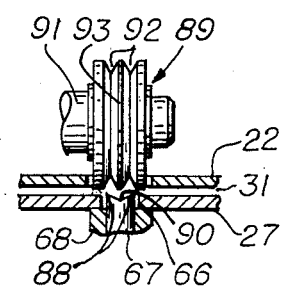
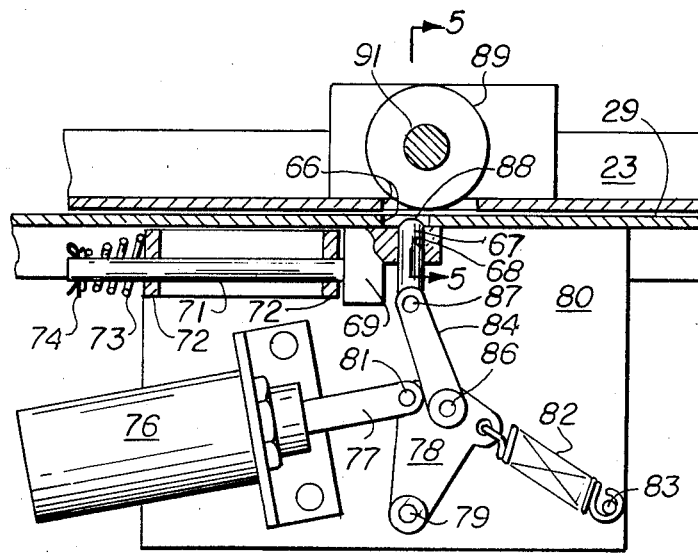

MAGNETIC CARD FEED MECHANISM AND IMPACTOR

This invention relates to a new and improved magnetic card feed mechanism and impactor. Reference is made to earlier patents of assignee, U.S. Pat. No. 4,020,325 issued Apr. 26, 1977, and U.S. Pat. No. 4,024,379 issued May 17, 1977, on which the present invention is an improvement. Many of the objects and advantages of the prior patents are applicable to the present invention. It will be observed that many of the mechanisms hereinafter described are likewise disclosed in said patents; and for brevity, some of these features are not herein described in detail.

A continuing problem in the service of providing coin operated laundry machines installed in apartment houses and other locations is the temptation to cheat the machines either by the use of slugs, by prying open coin boxes, etc. The use of encoded magnetic tape cards which initially are so encoded as to furnish plural operations of the washer or dryer machines is disclosed in said patents. The present invention provides a number of improvements thereon.

One of the principal features of the present invention is that as the card is fed through the machine a punch impacts slits on the card in a proper location (depending upon the number of available uses remaining on the card), and this permanently marks the card in such a way so as to indicate to the user the number of uses remaining on the card and to reduce disputes between the management and the patrons over the number of times the card has been used. Each time the card is used, the slits are impacted in a different position, in sequence, so that they may readily be counted to settle such disputes or to indicate to the patron how many uses remain.

Another feature of the card is that the cost of each use need not necessarily be in integral multiples of 5¢, 10¢ or 25¢. Consequently, the cost of each use may be set to any value, even fractional.

Another feature of the invention is the fact that although the card is slit, no holes are punched and there is no chaff which might otherwise cause a disposal problem or might interfere with proper operation of the card feed or the electronic system of the machine.

The formation of the slits is such that the slits are curved and the card itself is stretched in a curvature which makes it impossible to flatten the card to conceal the slits and thus cheat the machine.

Furthermore, the raised slits are readily felt and can, therefore, be easily counted by persons having visual impairment.

Another feature of the invention is the fact that a tachometer wheel is attached to the drive shaft of the machine, the wheel being notched and a photo sensor/emitter being placed in proximity thereto so that as the wheel turns the distance the card moves is measured by counting the pulses generated by the photo sensor/emitter wheel combination. This makes it possible to properly actuate the impactor so that the slits are properly positioned even though the card speed may not necessarily be controlled. Reference is made to U.S. Pat. No. 3,914,789 disclosing a somewhat similar pulse counting means used for a different purpose.

Another feature of the invention is that the punching of the slits and the writing of the new information on the magnetic strip are independent functions, as explained hereinafter, and consequently do not affect the integrity of the writing of the new information or the proper positioning of the punch on the card.

Other objects of the present invention will become apparent upon reading the following specification and referring to the accompanying drawings in which similar characters of reference represent corresponding parts in each of the several views.

In the drawings:

FIG. 4 is an enlarged fragmentary sectional view taken substantially along the line 4—4 of FIG. 3.

FIG. 5 is a transverse fragmentary sectional view taken substantially along the line 5—5 of FIG. 4.

FIG. 6 is a greatly enlarged fragmentary section showing the card after slits have been impacted therein.

FIG. 7 is a fragmentary elevational view along the line 7—7 of FIG. 2.

Figure 1:
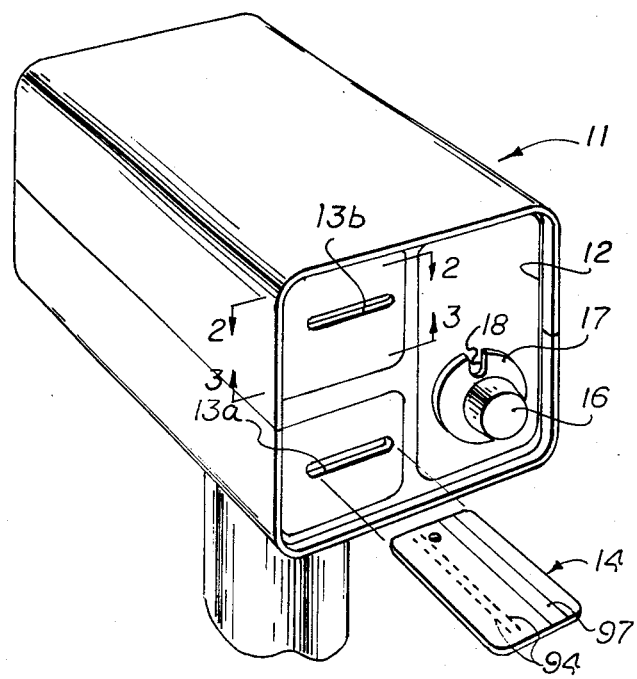
FIG. 1 is a perspective view of the apparatus of the present invention showing a card about to be inserted.
Figure 2:
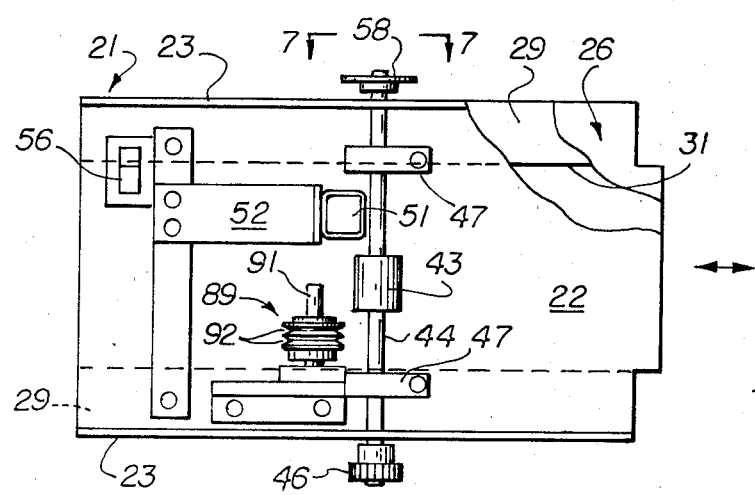
FIG. 2 is a sectional view taken substantially along the line 2—2 and showing mechanism above the path of movement of the card.
Figure 3:
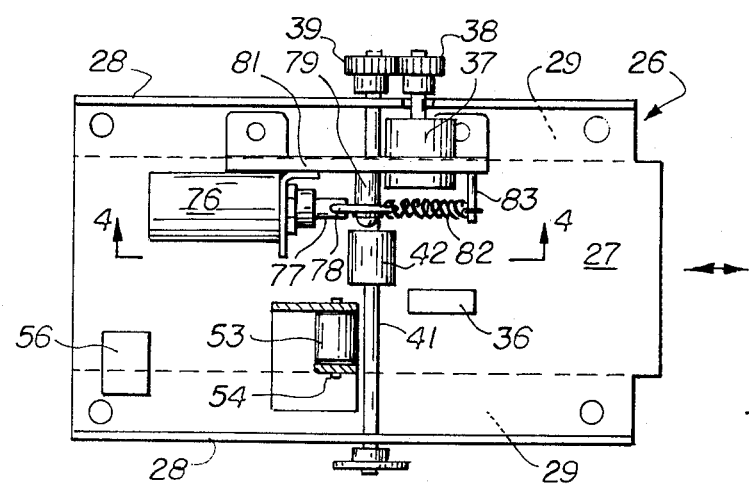
FIG. 3 is a sectional view taken substantially along the line 3—3 of FIG. 1 and showing mechanism below the path of the card.

As has been stated, many of the mechanisms hereinafter described appear in the aforesaid U.S. Pat. Nos. 4,020,325 and 4,024,379 and their structure and operation are described in detail and are not repeated herein. Directing attention to FIG. 1, a casing 11 suitable for installation in an area where a plurality of washing and drying machines are installed is shown. It will be understood that the invention hereinafter described is useful in other environments but the presently preferred use is as has been heretofore stated. Features of the structure shown in FIG. 1 are the use of plural card insertion slots 13a, 13b for the card 14. The plural slots are useful so that if the mechanism or electronics associated with one of the slots is malfunctioning, the user may insert the card in the other slot, thereby preventing all of the laundry machines from being inoperative. In a preferred use, there are a number of laundry machines. The patron turns the knob 16 to select a particular machine which he wishes to use. Thus, skirt 17 on the knob is formed with a window 18 through which a number corresponding to the selected machine is observed. Above and behind slot 13 is an upper tray 21 consisting of a smooth, horizontal plate 22 and longitudinally extending, upwardly bent side flanges 23. Below the slot 13 is a lower tray 26 likewise having a horizontal smooth plate 27 and downturned side edge flanges 28. Shims 29 space the plates 22 and 27 apart a distance slightly greater than the thickness of the card 14 and the inner edges of the shims 29 are spaced apart a distance slightly greater than the width of the card 14, all as explained in the prior patents. Thus, there is a passageway 31 in registry with one of the slots 13 which accurately guides passage of the card 14 into and out of the machine.

Mounted on bottom tray 26 is a microswitch 36 having a switch arm which extends into the passageway 31. When the patron inserts the card 14 into the slot 13, the inner edge of the card moves the arm (not shown) of the microswitch 36 and this energizes motor 37. On the shaft of the motor 37 is an idler 38 which meshes with gear 39 on the end of drive shaft 41. A knurled roller 42 is fixed for rotation with shaft 41 and engages the card 14 and drives it inward of the apparatus. Mounted on the lower tray 26 is a back-up roller 43 in registry with roller 42. Roller 43 is mounted on the shaft 44 carrying a gear 46 which meshes with gear 39. Springs 47 bear upon shaft 44 and bias the back-up roller 43 toward the roller 42 so that pressure is applied on the card 14, and as the rollers 42, 43 turn, the card is frictionally engaged and driven. The positions of rollers 42 and 43 is such that when the patron has fully inserted the card 14 the motor 37 pulls the card into the machine so that it does not remain outside of the slots 13 and mischievous interference with operation is eliminated.

As the card is driven into the machine, it passes a reading and recording head 51 positioned above a window in plate 22. Head 51 is mounted on a spring 52 secured to plate 22 and biased into the passageway 31 so that the head 51 is in close proximity to the card. A back-up roller 53 having a shaft 54 is mounted on the plate 27 immediately below head 51 and also fitting into an aperture in plate 27. This insures that the card travels in proximity to the head 51.

At the inner end of plate 22 is another window in which is installed optical sensor 56. When the inner edge of the card 14 encounters the sensor 56, by electrical means hereinafter explained, the motor 37 reverses and rollers 42, 43 drive the card 14 toward slot 13 until the punch 67 impacts the card. The motor 37 reverses again, the card 14 is driven inward until the inner edge of the card 14 again encounters the sensor 56. The motor 37 reverses a third time and rollers 42, 43 drive the card 14 out of the machine and eventually through the slot 13.

Gaps 66, which are longitudinally elongated, are formed in plates 22 and 27. Moveable through gaps 66 in lower plate 27 is a punch 67, hereinafter described in greater detail. Punch 67 reciprocates in a bushing 68 fixed in a horizontally moveable slide 69. Rod 71 is reciprocable in guides 72 on punch frame 80. At one end, rod 71 is attached to slide 69. The other end extends out beyond guide 72 and is biased by spring 73 held in place by retainer 74 to the right as viewed in FIG. 4.

Solenoid 76 actuates the movement of punch 67. The armature 77 of solenoid 76 is connected by pin 81 to crank 78 which is pivoted by pivot 79 to punch frame 80. Spring 82 is fixed at one end to crank 78, and at its other end to anchor 83. Spring 82 biases the crank 78 clockwise as viewed in FIG. 4. Link 84 is pivoted by pivot 86 at one end to the crank 78 and by pin 87 at its opposite end to the punch 67. Thus, as solenoid 76 retracts the armature 77, the punch 67 is moved upward; and upon de-energization of the armature 77, the spring 82 returns the parts to the position shown in FIG. 4.

Directing attention now to FIG. 5, the punch 67 is round in cross section except at its distal end where a transverse notch 90 is formed dividing the distal end into two cutting edges 88. Mounted on the upper tray 21 and extensible through an aperture in the plate 22 is a back-up wheel 89 having a shaft 91 mounted upon the plate 22. There are two grooves 92 formed in the surface of the wheel 89 complementary in shape to the cutting edges 88 of the punch 67. A ridge 93 is between the grooves 92.

The card 14, as best shown in FIG. 6, is cut in semicircular cuts 94 by the cutting edges 88, and the material of the card 14 between the cuts 94 is stretched in a curvature 96, the material of the card 14 being stretched by the cooperative action of the edges 88 and the ridge 93. Hence, even though pressure, such as by ironing with an electric iron, is applied over the slits 94 the card is permanently deformed so as to eliminate any dispute as to how many times a given card 14 has been punched.

As the card 14 moves toward the slot 13 in the passage 31, at a time interval which depends upon the speed of rotation of the shaft 41 (as determined by the tachometer wheel 58) and by the number of uses remaining on the card, the solenoid 76 is energized. Tachometer wheel 58 is formed with radial slots 59 which are read by second sensor 61. Sensor 61 thus emits timing pulses which are transmitted to the Positioning Counter shown in FIG. 8 to energize solenoid 76 at the proper time. The edges 88 then engage the card 14, but the card continues to move to the right, as viewed in FIG. 4, pulling the slide 69 with the card, against the force of the spring 73. After the slits 94 have been fully formed, the solenoid 76 is de-energized, the spring 82 retracts the punch 67 from contact with the card and the spring 73 returns the slide 69 to initial position.

It will be understood that the card 14 has a magnetic tape strip 97 longitudinally thereon in a position such that it will not be damaged by the drive wheels 42 and 43, and the tape 97 will pass directly under the head 51.

Figure 8:
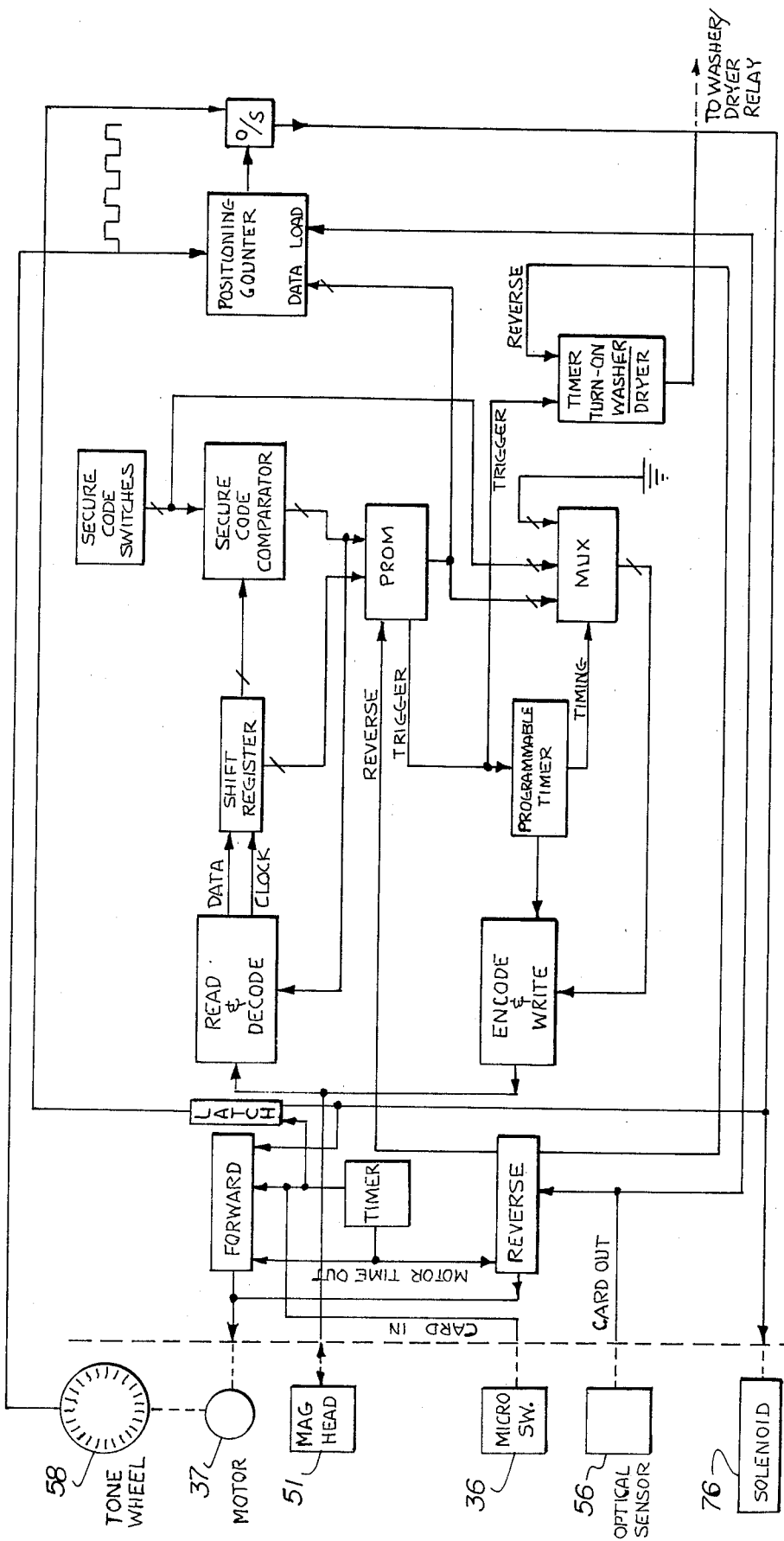
FIG. 8 is a schematic block diagram of a preferred electronic system for the invention.

Attention is now directed to FIG. 8, a block diagram of the electrical circuitry. When the leading edge of the card 14 closes the switch 36, a signal is directed to the forward relay which starts motor 37 and also the timer. The timer turns off the motor 37 after ten seconds so as to prevent the motor from burning out should a jam occur. The strip 97 passes under the magnetic head 51 which reads the material which has previously been encoded thereon (as per prior U.S. Pat. No. 4,020,325). First, the security code which has previously been encoded on the strip is compared with the security code for the particular machine. It will be understood that it is desirable that a given card 14 be used only with one establishment where washer/dryers are installed; or, at most, a restricted series of such establishments. If the security codes on the card compare with that for the particular installation as determined by the comparator, the shift register also stores the number of uses still remaining recorded on the tape. In the event the number encoded on the strip is zero, the card is moved out of the machine without further action occurring. The progress of the card closes the optical sensor 56 which reverses the motor 37 through the reverse relay and also sends a signal to the positioning counter. Tachometer wheel 58 turns with motor 37 and feeds signals to the position counter. As the motor 37 turns to drive the card, the tachometer wheel 58 likewise is turning and is feeding signals to the position counter. At the proper time the one shot is energized, and this activates the solenoid 76 to impact the card 14 as has previously been explained. Meanwhile, the programmer energizes the timer which turns on the washer/dryer relay, the particular machine being selected by means of the knob 16 (shown in FIG. 1 but not in FIG. 8). The PROM (Programmable Read Only Memory) is addressed by the contents of the shift register, the output of the PROM then being one less than the contents of the shift register unless the content of the shift register is already zero at which point the output of the PROM remains zero. The output of the PROM determines the number of uses remaining on the card and which number is to be encoded onto the card. The magnetic head 51 is then energized to encode on the strip 97 the security code and the PROM output.

In a preferred embodiment, also shown in FIG. 8, a latch (e.g., 74LS74 produced by Texas Instruments, a standard TTL part) is installed in the circuit. Switch 36, which is closed by the card being inserted in the machine, is connected to energize the latch. The latch is connected to the "one shot." The one-shot is connected both to the solenoid 76 which causes the impactor to impact the card and also back to the latch. This circuitry causes the card to be fed into the machine until optical sensor 56 is reached, whereupon, the motor 37 is reversed and drives the card outward for the number of washes remaining on the tape, as determined by the positioning counter and tone wheel 58. This energizes the "one shot" causing solenoid 76 to impact the card. The card is then driven inward once again until the optical sensor 56 is energized, whereupon, the motor is reversed driving the card out of the machine. During this last reversal, the encoded signal is written onto the magnetic strip. This procedure allows for the operation of the punch and the writing of the new encoded signal to be independent of each other, thus avoiding any deleterious effects which may occur should the punch cause a brief hesitation in the movement of the card. Since the "one shot" has already been activated, no impacting of the card occurs on the last-mentioned travel of the card.

What is claimed is:

1. A reader encoder apparatus for a card having a longitudinal strip capable of being magnetically encoded, said strip being encoded with a plurality of pulses, and a longitudinal zone to one side of said strip, said card having leading and trailing transverse edges, said apparatus comprising a casing formed with a longitudinal passageway shaped to permit longitudinal movement of said card through said passageway, at least one roller having a transverse axis mounted in said casing positioned to engage said card and drive said card longitudinally of said passageway, first electrical means for turning said roller in both directions, first means for sensing insertion of said card in said passageway and actuating said first electrical means in a first direction to drive said card longitudinally into said casing, second means for sensing presence of said card adjacent the inner end of said passageway and to effect reversal of said first electrical means in a second direction to drive said card longitudinally outwardly relative to said casing, a reading writing head positioned in said passageway in proximity to said strip, and punch means mounted in said casing having a punch reciprocable into said passageway to punch said card, punch actuating means to reciprocate said punch to punch said card at a pre-selected point in said longitudinal zone, second electrical means connected to said head for reading the information encoded in the pulses on said strip as said card is driven into said casing, energizing said punch actuating means at a time as said card is being driven outwardly of said casing dependent upon the information encoded in said pulses and for recording through said head on said strip as said card is being driven out of said casing a pulse train representing a number one less than the number read by said head as said card was being driven into said casing.

2. Apparatus according to claim 1 which further comprises a slide longitudinally reciprocable in said casing adjacent said passageway, a bushing on said slide receiving said punch, said slide moving in the direction of movement of said card when said punch engages said card, and means for returning said slide to initial position when said punch disengages from said card.

3. Apparatus according to claim 2 in which said punch actuating means comprises a solenoid mechanically connected to said punch to reciprocate said punch in said bushing.

4. Apparatus according to claim 1 in which the distal end of said punch is formed in a concavity having a longitudinal axis, said punch having opposed spaced cutting edges on opposite sides of said concavity, and which further comprises a wheel in said casing on the side of said passage opposite said punch having grooves spaced to receive said cutting edges and a ridge between said grooves, said cutting edges forming spaced slits in said card and said ridge stretching said card between said slits.

5. Apparatus according to claim 1 which further comprises timing means movable with said roller, sensing means generating electrical pulses dependent upon movement of said timing means, said second electrical means including said sensing means whereby energizing of said actuating means is dependent on actual movement of said card.

6. Apparatus according to claim 1 which further comprises a tachometer wheel turning with said roller having radial slots, a photosensor mounted on said casing generating timing pulses dependent on rotation of said slots, said second electrical means receiving said timing pulses and energizing said actuating means upon receiving a predetermined number represented by timing pulses, said predetermined number being dependent upon the number of said first-mentioned pulses read by said head as said card is driven into said casing.

7. Apparatus according to claim 1 which further comprises electrical latch means in an electrical circuit including said first and second electrical means, said punch actuating means and said first and second means for sensing presence of said card, said latch causing said second electrical means to de-energize when said punch actuating means is de-energized and then to re-energize said first electrical means to drive said card inwardly of said machine until said second means for sensing is energized and then to drive said card out of said machine without again energizing said punch actuating means while said second electrical means is writing a new electronic signal onto said magnetic strip.

* * * * *